US012591573B2

(12) United States Patent　　(10) Patent No.: US 12,591,573 B2

Pasupuleti et al.　　(45) Date of Patent: Mar. 31, 2026

(54) AUTOMATIC ERROR MITIGATION IN DATABASE STATEMENTS USING ALTERNATE PLANS

(71) Applicant: Oracle International Corporation, Redwood Shores, CA (US)

(72) Inventors: Krishna Kantikiran Pasupuleti, Belmont, CA (US); Hong Su, San Carlos, CA (US); Jiakun Li, San Mateo, CA (US); Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 261 days.

(21) Appl. No.: 17/902,615

(22) Filed: Sep. 2, 2022

(65) Prior Publication Data

US 2024/0078233 A1　　Mar. 7, 2024

(51) Int. Cl.
　*G06F 16/24*　　(2019.01)
　*G06F 11/34*　　(2006.01)
　*G06F 16/2453*　　(2019.01)
　*G06F 16/2455*　　(2019.01)

(52) U.S. Cl.
　CPC .... *G06F 16/24542* (2019.01); *G06F 11/3419* (2013.01); *G06F 16/24552* (2019.01)

(58) Field of Classification Search
　None
　See application file for complete search history.

(56) References Cited

U.S. PATENT DOCUMENTS

| | | | |
|---|---|---|---|
| 2009/0043745 A1* | 2/2009 | Barsness ........... | G06F 16/24547 |
| 2009/0094192 A1* | 4/2009 | Bestgen ............ | G06F 16/24549 |
| 2009/0106320 A1 | 4/2009 | Dageville et al. | |
| 2009/0287664 A1* | 11/2009 | Angelo ................ | G06F 16/951 |
| 2010/0306188 A1* | 12/2010 | Cunningham .... | G06F 16/24542 707/769 |
| 2015/0154255 A1* | 6/2015 | Cole .................. | G06F 16/24542 707/718 |
| 2017/0098012 A1* | 4/2017 | Zhu ..................... | G06F 16/9535 |
| 2017/0300536 A1* | 10/2017 | Gupta ............... | G06F 16/24545 |
| 2020/0142945 A1* | 5/2020 | Pellow ............... | G06F 16/9538 |
| 2022/0075783 A1* | 3/2022 | Li .......................... | G06F 16/248 |
| 2022/0114179 A1* | 4/2022 | Zheng ............... | G06F 16/24524 |

FOREIGN PATENT DOCUMENTS

KR　　2018-0104498 A　* 9/2018

* cited by examiner

*Primary Examiner* — Augustine K. Obisesan
(74) *Attorney, Agent, or Firm* — Hickman Becker Bingham Ledesma LLP

(57) ABSTRACT

Techniques for automatic error mitigation in database systems using alternate plans are provided. After receiving a database statement, an error is detected as a result of compiling the database statement. In response to detecting the error, one or more alternate plans that were used to process the database statement or another database statement that is similar to the database statement are identified. A particular alternate plan of the one or more alternate plans is selected. A result of the database statement is generated based on processing the particular alternate plan.

20 Claims, 4 Drawing Sheets

200

210
RECEIVE A DATABASE STATEMENT

220
DETECT AN ERROR WHILE COMPILING THE DATABASE STATEMENT

230
IDENTIFY ONE OR MORE ALTERNATE PLANS

240
SELECT AN ALTERNATE PLAN

250
GENERATE A RESULT OF THE DATABASE STATEMENT BASED ON PROCESSING THE ALTERNATE PLAN

200

210
RECEIVE A DATABASE STATEMENT

220
DETECT AN ERROR WHILE COMPILING THE DATABASE STATEMENT

230
IDENTIFY ONE OR MORE ALTERNATE PLANS

240
SELECT AN ALTERNATE PLAN

250
GENERATE A RESULT OF THE DATABASE STATEMENT BASED ON PROCESSING THE ALTERNATE PLAN

Figure 4:
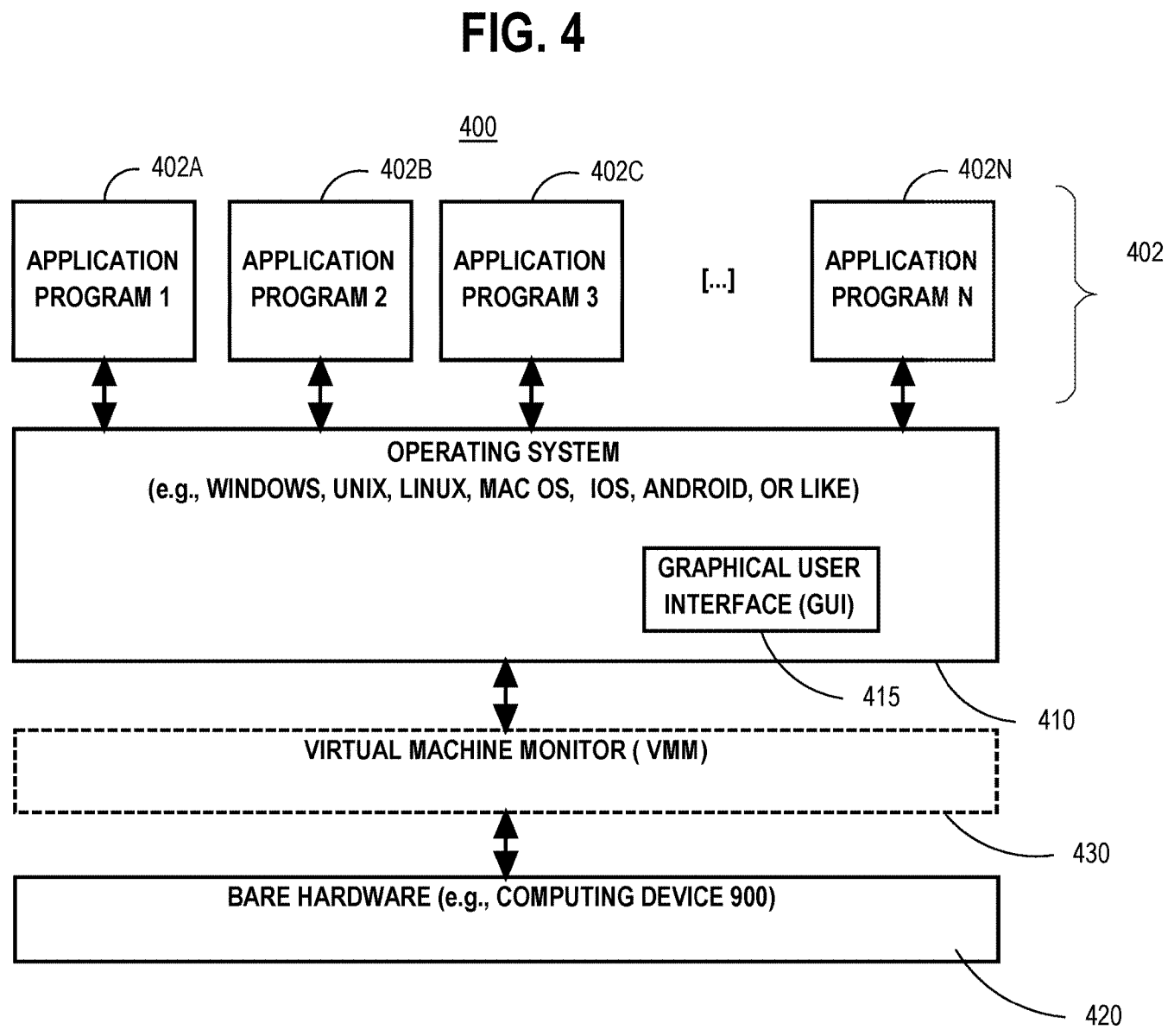

402A
APPLICATION PROGRAM 1

402B
APPLICATION PROGRAM 2

402C
APPLICATION PROGRAM 3

[...]

402N
APPLICATION PROGRAM N

402

OPERATING SYSTEM
(e.g., WINDOWS, UNIX, LINUX, MAC OS, IOS, ANDROID, OR LIKE)

GRAPHICAL USER INTERFACE (GUI)

415

410

VIRTUAL MACHINE MONITOR ( VMM )

430

BARE HARDWARE (e.g., COMPUTING DEVICE 900)

420

AUTOMATIC ERROR MITIGATION IN DATABASE STATEMENTS USING ALTERNATE PLANS

BACKGROUND

Compilation of a database statement is the process of parsing and analyzing the database statement in order to generate an execution plan for the database statement. The execution plan may then be executed in order to generate results, such as the returning rows of a column of a database table, where the rows satisfy certain criteria.

During compilation of a database statement, a statement compiler (also referred to as a "query optimizer") may encounter various types of errors. For example, one type of error might be raised if there is an attempt by the query optimizer to access memory that is out of scope of the process address space. Another type of error might be raised if there is an assertion failure in the code.

One way to handle such a compilation error is to present the error to a user, such as a database administrator. The user can then view the error and perform some manual actions, such as resubmitting the database statement. This approach negatively affects the user experience and requires manual intervention, which itself may be error prone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 is a block diagram of a basic software system that may be employed for controlling the operation of the computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatic error mitigation in database statement compilation are provided. In one technique, if a statement compiler (or query optimizer) detects or otherwise encounters an error during compilation of a database statement, then the statement compiler searches one or more repositories to identify a suitable alternate plan that can be used to process the database statement. The alternate plan is identified and used in the same database session in which the compilation error was detected. The user may or may not be notified of the identification and subsequent processing of the alternate plan. In this way, the error handling is transparent so that the database user's experience is not negatively impacted

Example Database System

Figure 1:
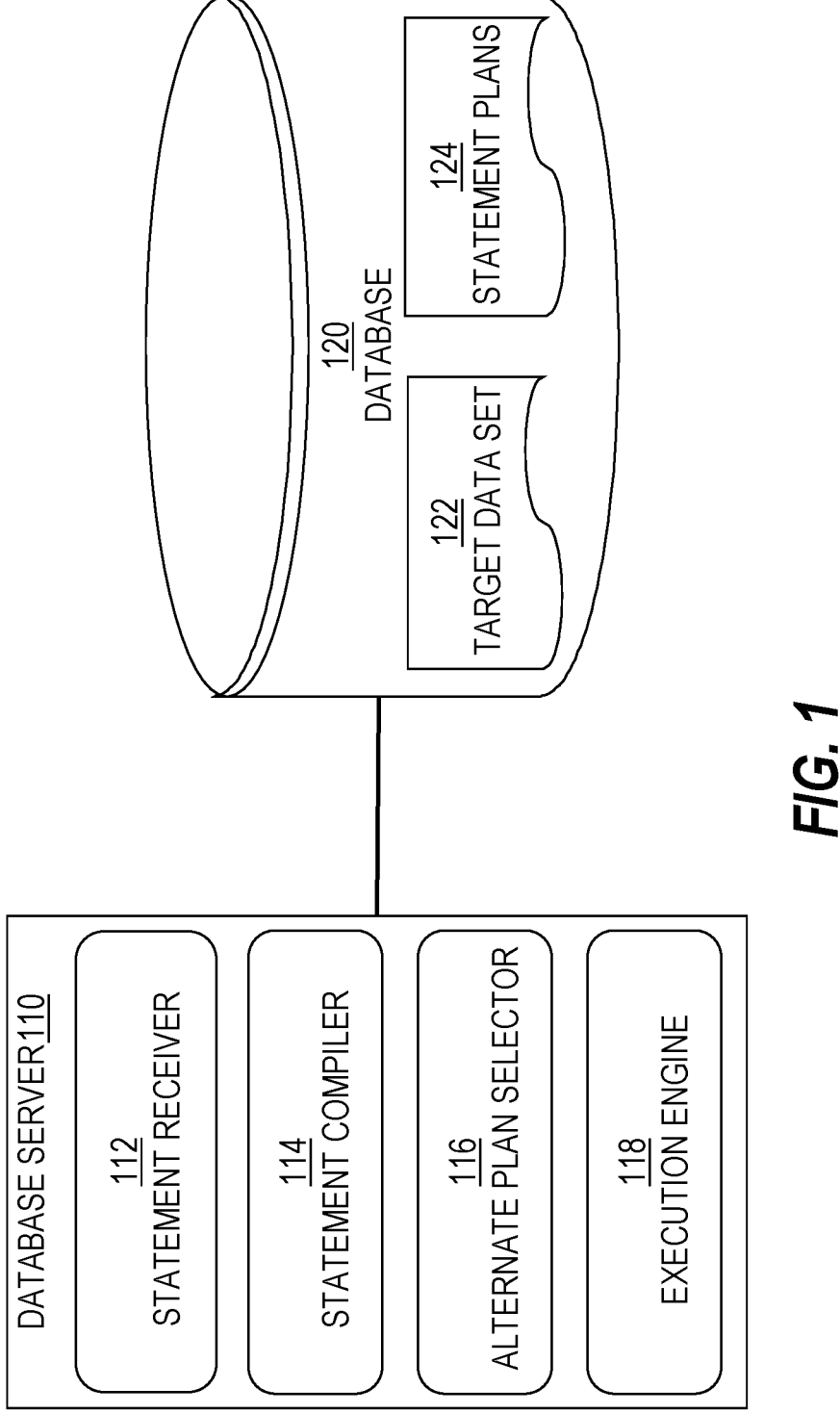
FIG. 1 is a block diagram that depicts an example database system that comprises a database server and a database, in an embodiment.

FIG. 1 is a block diagram that depicts an example database system 100 that comprises a database server 110 and a database 120, in an embodiment. Database system 100 may include multiple database servers (not depicted) and multiple databases (not depicted). Database system 100 may be a shared nothing database system, a shared everything database system, or a combination of both.

Database server 110 executes on one or more computing devices. Database server 110 includes a statement receiver 112 that receives database statements (e.g., SQL statements) from one or more database clients (not depicted), statement compiler 114 (also referred to as a "query optimizer") that compiles database statements received through statement receiver 112, an alternate plan selector 116 that identifies and selects alternate plans in response to detection of compilation errors, and an execution engine 118 that executes execution plans generated by statement compiler 114. An "alternate plan" is a historical plan that statement compiler 114 generated in the past and was used to successfully process a database statement.

A compilation error is any error that occurs during statement compilation that prevents the compilation from successfully completing, which successful completion would result in a valid (executable) execution plan. If no errors are encountered during compilation of a database statement, then alternate plan selector 116 is not invoked or executed with respect to that database statement. If an error is encountered during compilation of a database statement, then alternate plan selector 116 identifies an alternate plan, which may then be processed by statement compiler 114 to generate an execution plan for the database statement.

Each of statement receiver 112, statement compiler 114, alternate plan selector 116, and execution engine 118 is implemented in software, hardware, or a combination of software and hardware. Database server 110 responds to requests from one or more database clients executing on one or more computing devices (not depicted). Client requests includes requests to read target data 122 stored in database 120 and requests to update target data 122 stored in database 120, such as deleting, adding, and updating (i.e., replacing an existing value with a new value), which may be treated as a deletion followed by an insertion.

A database user session includes a connection between a database client and database server 110 and involves the database client (1) sending one or more database statements or requests to database server 110 via the connection and (2) receiving (based on the statements/requests) results from database server 110 via the connection.

Database 120 is stored on a persistent storage device and includes target data 122 and statement plans 124. Although depicted as if stored on the same storage device, target data 122 may be stored on a different storage device than the storage device on which statement plans 124 are stored. Examples of target data 122 include one or more relational tables, one or more files, one or more arrays of values, one or more linked lists, or any combination thereof.

Although target data 122 is depicted as being stored in database 120, different portions of target data 122 may also be simultaneously stored in (e.g., volatile memory of) database server 110. For example, statement receiver 112 receives a database statement that requests (or queries), from a particular column of a certain table that is stored in database 120, data that satisfies filter criteria. Execution engine 118 executes an execution plan that statement compiler 114 produces based on the database statement. As part of that execution, execution engine 118 retrieves data from the particular column from database 120 and stores that data (at least temporarily) in data storage that is local to database server 110. Execution engine 118 may then apply the filter criteria to the retrieved data in order to generate a result of the database statement, and then ultimately returning the result to the database client that submitted the database statement.

Types of Plans

Statement plans 124 may comprise multiple types of alternate plans, examples of which include an execution plan and an outline. Metadata associated with each statement plan may include a type identifier that identifies the type of plan. An execution engine can process execution plans to generate results for the corresponding database statements, but cannot process outlines, which represents an intermediate stage between receipt of a database statement and generation of an execution plan. An execution plan is relatively elaborate, storing information pointers and rollback terms, etc. An execution plan in memory may be represented as a directed acyclic graph structure (DAG), which is used by an execution engine to execute a database statement. This DAG representation can be viewed as a "physical" representation that is executable. Compared to outlines, execution plans are short-lived and, thus, cannot be used to process a subsequent database statement after a brief period of time.

An outline is more "logical" than an execution plan in that an outline contains information that, when used during compilation, helps statement compiler 114 in generating the desired execution plan. Thus, an outline must be compiled by statement compiler 114 in order to be used (indirectly) to process a database statement.

The information in an outline includes a set of hints or directives. Examples of hints include an order of database processing (e.g., performing a join operation before a filter operation or vice versa), performing an index scan of an index on a table rather than a table scan of the table, a merge hint that indicates a view query block should be merged into its parent query block, and a leading hint (which is an example of a join-order hint) that specifies the full or partial order in which tables are to be joined.

An outline is much more compact than an execution plan. For example, an execution plan may be two orders of magnitude larger (in terms of bytes) than an outline. Outlines may be stored in volatile memory (e.g., RAM), in non-volatile memory (e.g., on disk), and ported across releases. Because execution plans are much larger in size than their outline counterparts, relatively few execution plans (at least fewer than outlines) may be stored in volatile memory.

Each execution plan may be associated with an outline. Thus, if an execution plan is removed from volatile storage (e.g., ages out of memory or is replaced in memory with another execution plan), then an outline that corresponds to the execution plan may remain in that volatile storage or may be moved to other storage, such as non-volatile storage or slower volatile storage. Alternatively, an outline may be stored in first storage (e.g., non-volatile storage) even while a corresponding execution plan is stored in second storage (e.g., volatile storage).

In an embodiment, each plan (whether an execution plan or an outline) is associated with a database statement from which the plan was generated. Storing an association between a plan and its corresponding database statement may comprise storing, in the same entry or data structure in which the plan is stored, (a) text of the database statement or (b) a reference to the text of the database statement.

In an embodiment, an alternate plan that a query optimizer selects in response to detecting an error during compilation of a database statement is an outline comprising multiple hints or directives. There may be scenarios where an alternate plan is an execution plan. A reason why a compilation of a database statement is being performed in the first place is that a possible execution plan (if one exists for the database statement) could not be used, for various reasons. One possible reason for not selecting an existing execution plan is because that plan used a different bind variable range. While using the execution plan might not be ideal for the present database statement, selecting and executing that execution plan in this instance may be better than ceasing processing and displaying an error.

Types of Compilation Errors

Statement compiler 114 may encounter multiple types of compilation errors, some of which are recoverable (i.e., by selecting and processing an alternate plan) and some of which are not. Examples of errors that are recoverable include assertion failures (i.e., an internal error where there is an inconsistency, such as where certain structural integrity is expected but does not exist), an incorrect pointer, or memory corruption.

An example of an error that is not recoverable is a table missing error where a database statement requests data from a particular table, but the particular table no longer exists because, for example, the particular table was dropped in the recent past. Even if there are hundreds of alternate plans that are otherwise valid, none of those plans could be used to process the database statement because each of those alternate plans references the particular table and the particular table no longer exists. Other examples of unrecoverable errors include syntax errors and incorrect semantics, such as selecting an incorrect column in a table and selecting a column in group-by query that is neither an aggregate nor a group-by key.

In an embodiment, if statement compiler 114 detects an error that is in a set of unrecoverable errors, then an alternate plan is not searched for. For example, statement compiler 114 does not invoke alternate plan in response to detecting that error. Instead, statement compiler 114 notifies the database user about the error. The notification may be transmitted over a computer network to a database client that is communicatively coupled to database server 110. The notification may identify the error and indicate that the error is not recoverable, e.g., it is not possible to respond to the request of the database statement.

Process Overview

Figure 2:
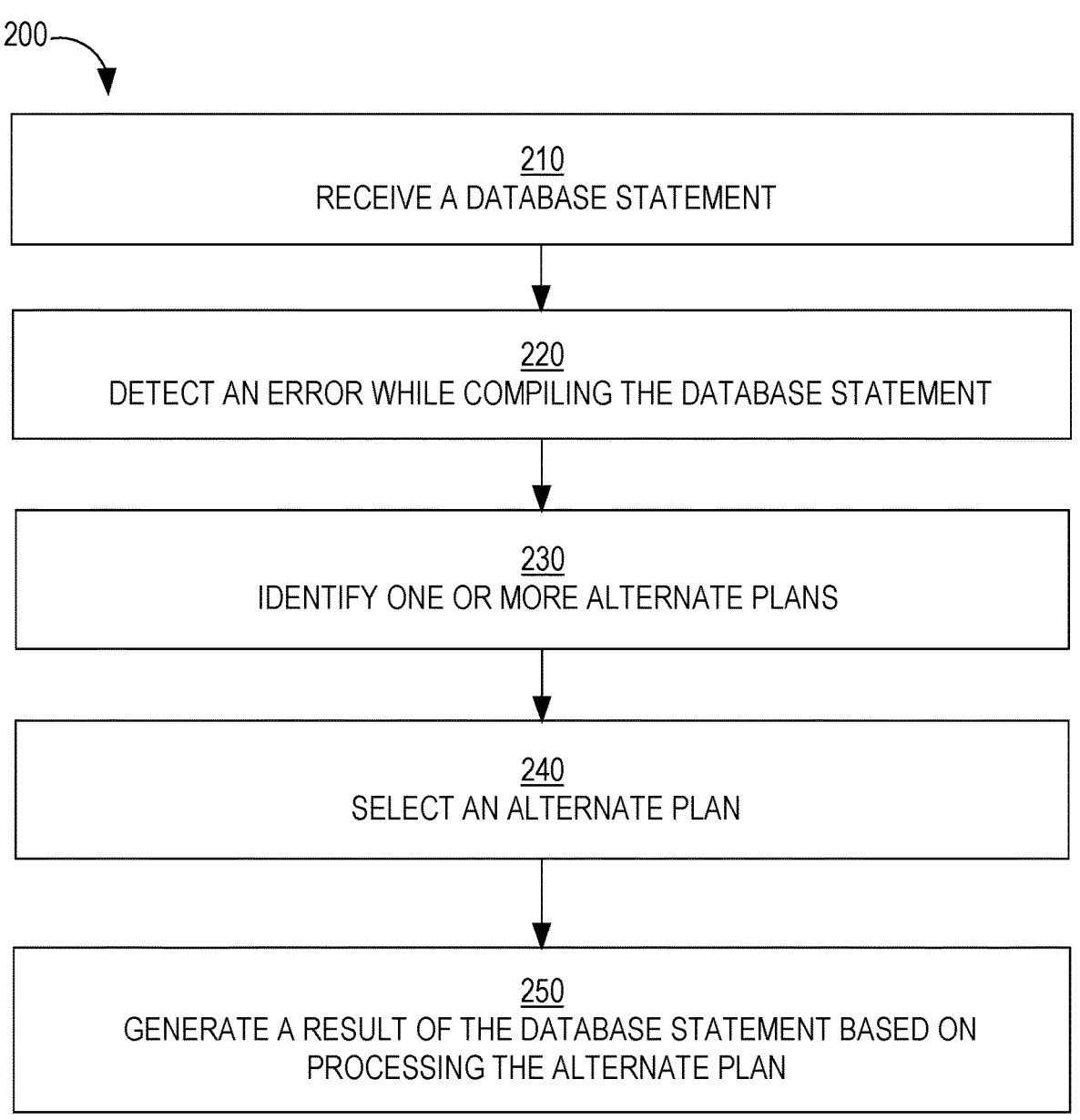
FIG. 2 is a flow diagram that depicts an example process for transparently handling database statement compilation errors, in an embodiment.

FIG. 2 is a flow diagram that depicts an example process 200 for transparently handling database statement compilation errors, in an embodiment. Process 200 may be performed by components of database server 110. Also, process 200 may be performed in a foreground process in a single database user session.

At block 210, a database statement is received. Block 210 may involve receiving the database statement from a database client that is remote relative to the database server. For example, the database client may be communicatively coupled to the database server over a computer network, such as the Internet. Block 210 may be performed by a receiving component that receives database statements, (optionally) performs one or more operations on the database statements (e.g., determining that the format of each database statement is valid), and forwards the database statements to a statement compiler (or query optimizer). Any validity checks may be performed instead by the statement compiler.

At block 220, an error is detected while compiling the database statement. The error is produced as a result of compiling the database statement. Block 220 is performed by a statement compiler.

At block 230, in response to detecting the error, one or more alternate plans are identified that were used to process the database statement or a similar database statement. Block 230 may involve accessing one or more repositories that store alternate plans and comparing text (or a signature) of the database statement received in block 210 with text (or signatures) of database statements associated with stored alternate plans. If the respective texts/signatures match, then an alternate plan associated with the stored matching database statement is identified.

In an embodiment, there are two types of matching in order to find an available alternate plan: (1) exact matching (EM), where an exact text match between database statements) is performed and (2) force matching (FM). EM uses the text while FM normalizes the text using binds for literals. Thus, multiple different database statements may have the same FM. For example, one database statement has the filter predicate T.c1<5 while another statement has the filter predicate T.c1<0. Both may have the same signature under FM and, thus, may rely on the same outline or execution plan to process the respective database statements.

At block 240, an alternate plan is selected. If multiple alternate plans were identified in block 230, then block 240 involves selecting an alternate plan from among those plans. The selection may be random. Alternatively, the selection is based on one or more selection criteria. Example selection criteria include the newest alternate plan, the alternate plan associated with the lowest execution time, the alternate plan associated with the lowest average execution plan, the alternate plan associated with the lowest number of data retrievals (or buffer gets), the alternate plan associated with the lowest memory usage, or a combination of the above. Block 240 may be performed by an alternate plan selector, a component that is separate from the database statement compiler.

At block 250, a result of the database statement is generated based on processing the selected alternate plan. The result may include multiple rows from one or more joined tables. Block 250 may involve processing (e.g., compiling by statement compiler 114) the selected alternate plan to generate an execution plan and then execution engine 118 executing the execution plan. If the selected alternate plan is an outline, then compilation of the database statement is referred to as an "outline-driven" compilation.

Selecting Among Multiple Alternate Plans

As block 230 indicates, multiple alternate plans may be identified in response to detection of a compilation error. As block 240 indicates, an alternate plan may be selected from multiple alternate plans according to one or more selection techniques.

In one selection technique, upon identifying the first alternate plan, that alternate plan is processed (e.g., compiled) immediately without waiting to identify other alternate plans. If no errors occur during compilation of this first alternate plan, then that alternate plan is used to process the database statement in question. If, on the other hand, a compilation error occurs, then a second alternate plan is identified and processed. If no errors occur during compilation of this second alternate plan, then the second alternate plan is used to process the database statement. If, on the other hand, a compilation error occurs, then a third alternate plan is identified and the process repeats.

In another selection technique, a search for alternate plans is conducted. After the search is complete (whether based on a time limit or based on a determination that all candidate alternate plans have been considered), multiple alternate plans are identified. The alternate plans are ranked or ordered based on one or more ranking criteria. For example, the alternate plans are ranked according to when those plans were last used, such that the alternate plan that was most recently used to process a database statement (without a failure or error) is ranked highest. As another example, the alternate plans are ranked according to resource consumption, such that the alternate plan that consumed the fewest computing resources is ranked highest. As another example, the alternate plans are ranked according to execution times, such that the alternate plan that is associated with the lowest execution time is ranked highest. In a related technique, each of the identified alternate plans is first compiled (if the alternate plans are outlines) and then any alternate plan that is not associated with a compilation error is ranked based on the one or more ranking criteria.

In a related selection technique, a cost of using each candidate alternate plan to process a database statement is estimated. The cost may be based on multiple cost dimensions, such as estimated memory usage, estimated number of disk accesses, and/or estimated time to execute an execution plan that is based on the alternate plan. The cost estimates of an alternate plan may come directly from analyzing the hints in the alternate plan or may be generated from analyzing an execution plan that is generated based on the alternate plan.

The estimate of each cost dimension associated with an alternate plan may be mapped to a particular cost unit. The mapped costs from the estimates of the cost dimensions may then be summed to generate an overall estimated cost of the alternate plan (or of the execution plan that is generated based on the alternate plan). Such a "universal" cost unit may be used to compare the estimated costs associated with different alternate plans.

Multiple Repositories

In an embodiment, database system 100 includes multiple repositories for storing alternate plans. In this embodiment, database server 110 automatically captures and stores all outlines, in a first repository, for all database statements ever compiled by statement compiler 114. The first repository may also include, for each of one or more outlines, execution statistics related to one or more executions that were based on that outline. In the context of error mitigation in response to compilation errors, execution statistics may include elapsed time, CPU time, and number of buffer gets. One or more of these execution statistics may be used in other contexts, such as identifying regressing statements.

In this embodiment, database system 100 also includes a second repository that stores statement plans that have been verified to have better performance than one or more other plans that are considered "stable." A stable plan is one that has been used to process one or more instances of a database statement and each execution of the one or more instances resulted in no failures or errors and the execution times associated with those executions are under one or more acceptable limits. The second repository may store some plans within a separate bucket until their respective performances are verified to be satisfactory. Performance of a plan is verified if that performance is compared with the performance of another plan for the same or similar database statement. If a verified plan is determined to have better performance than a counterpart plan, then the verified plan is moved to an approved list, which makes the plan eligible to be used again. Plans in the approved list are referred to as "accepted" plans. The second repository may be limited to storing execution plans. Nevertheless, each accepted plan may be associated with an outline.

Regarding the search for alternate plans in response to a compilation error, if alternate plans are stored in multiple plan repositories, then, according to one technique, alternate plan selector 116 searches each repository to identify any relevant alternate plans stored therein. Alternate plan selector 116 then applies one or more selection criteria to select from among multiple alternate plans that are identified.

According to a different technique, alternate plan selector 116 searches plan repositories in a particular order, such as based on priority or based on the quality of the alternate plans stored in the respective plan repositories. For example, if performance of an alternate plan has been verified against performance of another plan and is determined to be more performant, then the alternate plan is accepted and stored in a first repository that is searched first when an alternate plan search is performed. If performance of an alternate plan has been verified (or tested) against performance of another plan and is determined to be less performant, then the alternate plan is not accepted, but is stored in a second repository that is searched second in an alternate plan search.

Thus, if alternate plan selector 116 does not identify a candidate alternate plan in a first repository as part of an alternate plan search, then alternate plan selector 116 searches a second repository for one or more candidate alternate plans. If no alternate plans are found in the second repository, then a third repository is searched, and so on, depending on the number of different repositories in which alternate plans are stored. Thus, if the first repository only has a single alternate plan that is relevant in an alternate plan search, that alternate plan is selected and used to process a database statement even though there may be many alternate plans in one or more other plan repositories.

Compilation Error of an Alternate Plan

In some scenarios, an error might occur during compilation of an alternate plan for a database statement. The error might be the same or different than the error that triggered selection of the alternate plan. In an embodiment, in response to a compilation error encountered with respect to an alternate plan, alternate plan selector 116 selects another alternate plan, if one exists. Alternate plan selector 116 may select the other alternate plan using the same identification and selection process that alternate plan selector 116 used to select the original alternate plan. Thus, if alternate plan selector 116 identified (and ranked or ordered) multiple alternate plans in a first alternate plan search in response to a detection of a compilation error in compiling a database statement, then alternate plan selector 116 selects the next highest ranked alternate plan if an error is encountered while compiling the first selected alternate plan. The selection of a subsequent alternate plan and processing of that plan may be performed in the same database user session as the original alternate plan.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
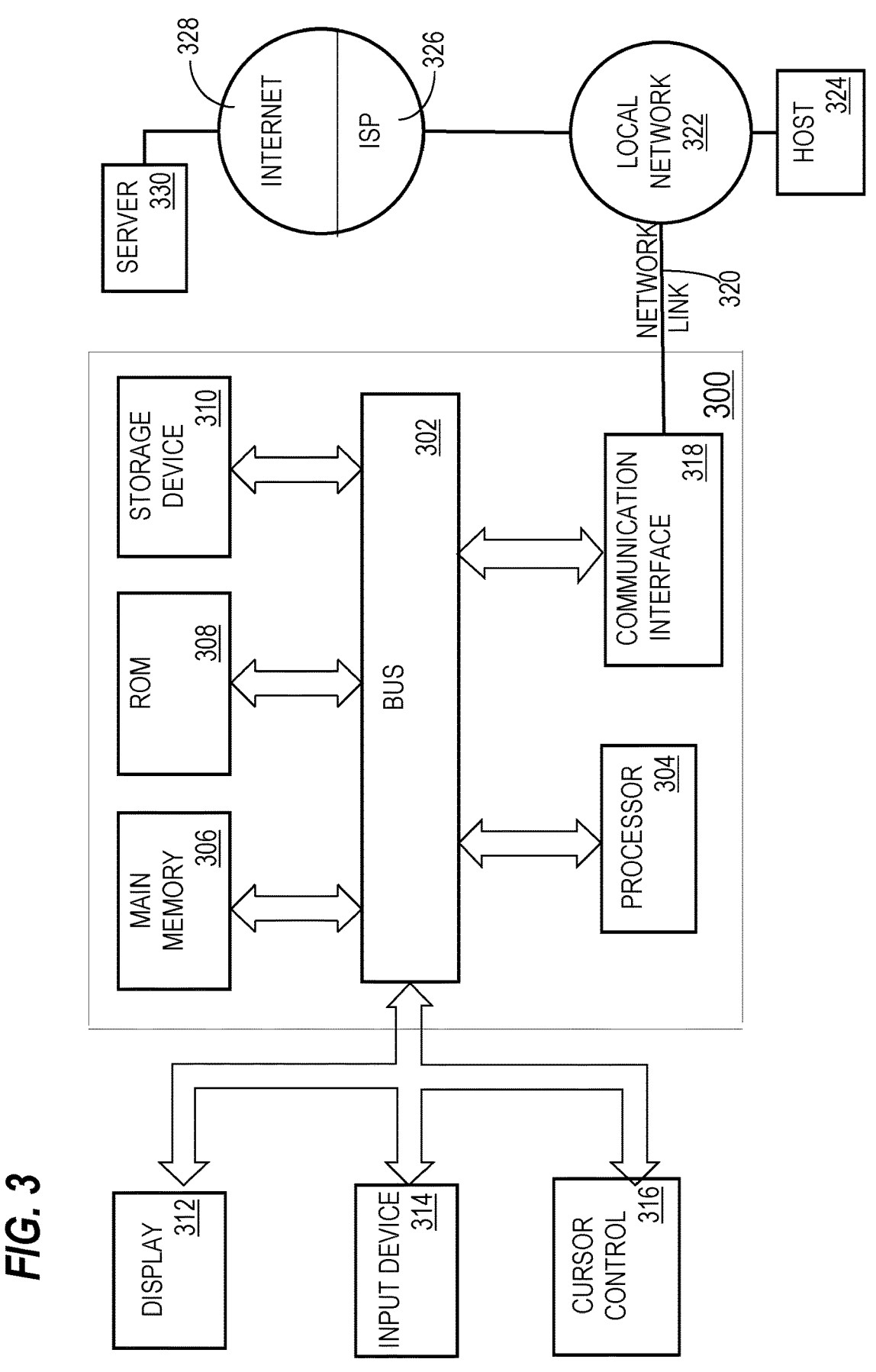
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

after receiving a database statement, detecting an error as a result of compiling the database statement, wherein the error prevents generation of an execution plan for the database statement;

in response to detecting the error, identifying one or more alternate plans that were used, previous to receiving the database statement, to process a prior instance of the database statement or another database statement that is similar to the database statement;

selecting a particular alternate plan of the one or more alternate plans;

generating a result of the database statement based on processing the particular alternate plan;

wherein the method is performed by one or more computing devices.

2. The method of claim 1, wherein:

the particular alternate plan is an outline that comprises a set of hints;

processing the particular alternate plan comprises generating an execution plan based on the outline;

generating the result comprises executing the execution plan.

3. The method of claim 1, wherein:

the one or more alternate plans are a plurality of alternate plans;

selecting the particular alternate plan comprises selecting the particular alternate plan based on one or more selection criteria.

4. The method of claim 3, wherein the one or more selection criteria comprise at least one of:

the most recently created alternate plan, the most recently used alternate plan, the alternate plan associated with the lowest estimated cost, the alternate plan associated with the lowest execution time, or the alternate plan associated with the fewest computer resources used.

5. The method of claim 3, further comprising:

generating a plurality of execution plans, one for each alternate plan of the plurality of alternate plans;

generating a cost estimate of each execution plan in the plurality of execution plans;

identifying a particular execution plan, from among the plurality of execution plans, that has the lowest estimated cost;

wherein the particular alternate plan is associated with the particular execution plan.

6. The method of claim 1, further comprising:

storing a first set of alternate plans in a first repository;

storing a second set of alternate plans in a second repository that is different than the first repository;

wherein the one or more alternate plans are stored in the first repository or the second repository.

7. The method of claim 6, wherein:

the first repository is ranked higher than the second repository;

identifying the one or more alternate plans comprises searching the first repository and identifying the one or more alternate plans in the first repository;

selecting the particular alternate plan without searching the second repository.

8. The method of claim 6, further comprising:

searching the first repository and not identifying any candidate alternate plans for the database statement in the first repository;

searching the second repository only in response to not identifying any candidate alternate plans in the first repository;

wherein identifying the one or more alternate plans comprises identifying the one or more alternate plans in the second repository.

9. The method of claim 6, wherein:

the first repository stores plans for all database statements compiled by a statement compiler;

the second repository stores a first plurality of plans that have been verified to have better performance than a second plurality of plans to which the first plurality of plans correspond.

10. The method of claim 6, wherein:

the second set of alternate plans stored in the second repository comprises a first subset of alternate plans and a second subset of alternate plans;

each alternate plan in the first subset of alternate plans has been verified to have better performance than one or more first plans that correspond to said each alternate plan;

each alternate plan in the second subset of alternate plans has not been verified to have better performance than one or more second plans that correspond to said each alternate plan in the second subset.

11. One or more non-transitory storage media storing instructions which, when executed by one or more computing devices, cause:

after receiving a database statement, detecting an error as a result of compiling the database statement, wherein the error prevents generation of an execution plan for the database statement;

in response to detecting the error, identifying one or more alternate plans that were used, previous to receiving the database statement, to process a prior instance of the database statement or another database statement that is similar to the database statement;

selecting a particular alternate plan of the one or more alternate plans;

generating a result of the database statement based on processing the particular alternate plan;

wherein the method is performed by one or more computing devices.

12. The one or more non-transitory storage media of claim 11, wherein:

the particular alternate plan is an outline that comprises a set of hints;

processing the particular alternate plan comprises generating an execution plan based on the outline;

generating the result comprises executing the execution plan.

13. The one or more non-transitory storage media of claim 11, wherein:

the one or more alternate plans are a plurality of alternate plans;

selecting the particular alternate plan comprises selecting the particular alternate plan based on one or more selection criteria.

14. The one or more non-transitory storage media of claim 13, wherein the one or more selection criteria comprise at least one of:

the most recently created alternate plan, the most recently used alternate plan, the alternate plan associated with the lowest estimated cost, the alternate plan associated with the lowest execution time, or the alternate plan associated with the fewest computer resources used.

15. The one or more non-transitory storage media of claim 13, wherein the instructions, when executed by the one or more computing devices, further cause:

generating a plurality of execution plans, one for each alternate plan of the plurality of alternate plans;

generating a cost estimate of each execution plan in the plurality of execution plans;

identifying a particular execution plan, from among the plurality of execution plans, that has the lowest estimated cost;

wherein the particular alternate plan is associated with the particular execution plan.

16. The one or more non-transitory storage media of claim 11, wherein the instructions, when executed by the one or more computing devices, further cause:

storing a first set of alternate plans in a first repository;

storing a second set of alternate plans in a second repository that is different than the first repository;

wherein the one or more alternate plans are stored in the first repository or the second repository.

17. The one or more non-transitory storage media of claim 16, wherein:

the first repository is ranked higher than the second repository;

identifying the one or more alternate plans comprises searching the first repository and identifying the one or more alternate plans in the first repository;

selecting the particular alternate plan without searching the second repository.

18. The one or more non-transitory storage media of claim 16, wherein the instructions, when executed by the one or more computing devices, further cause:

searching the first repository and not identifying any candidate alternate plans for the database statement in the first repository;

searching the second repository only in response to not identifying any candidate alternate plans in the first repository;

wherein identifying the one or more alternate plans comprises identifying the one or more alternate plans in the second repository.

19. The one or more non-transitory storage media of claim 16, wherein:

the first repository stores plans for all database statements compiled by a statement compiler;

the second repository stores a first plurality of plans that have been verified to have better performance than a second plurality of plans to which the first plurality of plans correspond.

20. The one or more non-transitory storage media of claim 16, wherein:

the second set of alternate plans stored in the second repository comprises a first subset of alternate plans and a second subset of alternate plans;

each alternate plan in the first subset of alternate plans has been verified to have better performance than one or more first plans that correspond to said each alternate plan;

each alternate plan in the second subset of alternate plans has not been verified to have better performance than one or more second plans that correspond to said each alternate plan in the second subset.

* * * * *